US 8,732,469 B2

(12) United States Patent
Sakai et al.

(10) Patent No.: US 8,732,469 B2
(45) Date of Patent: May 20, 2014

(54) COMMUNICATION CUTOFF DEVICE, SERVER DEVICE AND METHOD

(75) Inventors: Takashi Sakai, Kahoku (JP); Keiko Aruga, Kahoku (JP); Yuuichi Komuro, Kahoku (JP)

(73) Assignee: PFU Limited, Kahoku-shi, Ishikawa (JP)

( * ) Notice: Subject to any disclaimer, the term of this patent is extended or adjusted under 35 U.S.C. 154(b) by 904 days.

(21) Appl. No.: 12/824,813

(22) Filed: Jun. 28, 2010

(65) Prior Publication Data

US 2011/0029775 A1 Feb. 3, 2011

(30) Foreign Application Priority Data

Jul. 30, 2009 (JP) .................................. 2009-177924

(51) Int. Cl.
*H04L 9/32* (2006.01)
*H04L 29/06* (2006.01)
*G06F 21/33* (2013.01)

(52) U.S. Cl.
CPC .............. *H04L 63/105* (2013.01); *H04L 63/20* (2013.01); *G06F 21/335* (2013.01); *H04L 63/0823* (2013.01); *H04L 63/1433* (2013.01)
USPC ................ 713/171; 713/169; 726/4; 709/223

(58) Field of Classification Search
CPC ... H04L 63/105; H04L 63/20; H04L 63/0823; H04L 63/1433; H04L 9/3271; G06F 21/335; G06F 21/50; G06F 2221/2103; G06F 2221/2101
USPC .......................... 713/171, 169; 726/4; 709/223
See application file for complete search history.

(56) References Cited

U.S. PATENT DOCUMENTS

2005/0131997 A1  6/2005  Lewis et al.
2008/0229104 A1*  9/2008  Ju et al. ..................... 713/169

FOREIGN PATENT DOCUMENTS

JP    2006-134312 A    5/2006
JP    2008-271242 A    11/2008

OTHER PUBLICATIONS

Japanese Office Action dated Mar. 5, 2013, issued in corresponding Japanese Patent Application No. 2009-177924, w/ English translation (6 pages).
Hiramatsu, K. et al., "Security Inspection Software iNetSec Inspection Center", PFU Technical Review, vol. 16, No. 1, May 1, 2005, p. 29-34; cited in Japanese Office Action dated Mar. 5, 2013.

* cited by examiner

*Primary Examiner* — Ashok Patel
(74) *Attorney, Agent, or Firm* — Westerman, Hattori, Daniels & Adrian, LLP

(57) ABSTRACT

A network monitor device 20 includes: a communication cutoff unit 21 to cut off at least a part of communications performed by a quarantine target node 90; a redirect unit to make the quarantine target node 90 establish a communication connection for a quarantine process with a quarantine server 30 which executes the quarantine process of the quarantine target node 90; a cancel request receiving unit 24 to receive, when the quarantine target node 90 receives a ticket indicating completion of the quarantine via the communication connection for the quarantine process from the quarantine server 30, a cutoff cancel request ticket transmitted by the quarantine target node 90; and a cutoff canceling unit 26 to cancel the cutoff by the communication cutoff unit 21 when receiving the cutoff cancel request.

7 Claims, 10 Drawing Sheets

COMMUNICATION CUTOFF DEVICE, SERVER DEVICE AND METHOD

This application is based upon and claims the benefit of priority of the prior Japanese Patent Application No. JP2009-177924, filed on Jul. 30, 2009, the entire contents of which are incorporated herein by reference.

FIELD

The present invention relates to a communication cutoff device which cuts off communications performed by an information processing device connected via a network.

BACKGROUND

A network monitor device has hitherto existed, which guides, if a transmitter terminal of a received ARP (Address Resolution Protocol) request packet is in a pre-quarantining status, the packet from the pre-quarantining terminal to a self-device by sending a MAC (Media Access Control) address of the self-device as a response (refer to Japanese Patent Laid-Open Publication No. 2008-271242).

SUMMARY

On the occasion of using an information processing device, schemes of keeping a version of software in the latest status, applying a security patch and keeping a definition file, a detection engine, etc in their latest statuses by installing security software, have hitherto been recommended in term of ensuring the security against infection with malware etc and against a leakage of information. Further, in the case of participating the information processing device in a network requiring the high security such an enterprise network, a public institution network and a school network utilizes a technique, which is referred to as a so-called [quarantine], of checking an environment of the participant information processing device (as to whether or not a security-related environment satisfies a predetermined security policy), and permitting the information to participate in the network only when satisfying predetermined conditions but cutting off a network connection in other cases.

Introduction of a quarantine system for conducting the quarantine such as this, however, entails installing a network device including a quarantine function, changing a network topology in a way that accompanies this installation, installing a quarantine server into the network, and so on. Especially, the installation of the quarantine server takes a high cost for operation as well as for the installation and is therefore difficult to carry out. Herein, outsourcing is considered for getting the quarantine server, however, normally a firewall etc for rejecting a connection from the device on an external network is installed at a border between the external network and an internal network, and hence the quarantine server requiring the communication to the network device can not be installed on the external network. Therefore, a person, who introduces the quarantine system, needs to install the quarantine server himself or herself into an internal network. Under such circumstances, even though the necessity of introducing the quarantine system is recognized, a problem lies in difficulty of its introduction.

It is an object of the present invention, in view of the problem described above, to provide quarantining an information processing device in a network in a way that reduces costs for installing and operating a quarantine server by enabling the quarantine server to be installed on an external network.

The present invention solves the problem described above by including the following configurations. Namely, a communication cutoff device includes: a communication cutoff unit to cut off at least a part of communications performed by an information processing device; a redirect unit to make the information processing device establish a connection, to a server device, for a determining process of determining whether an environment of the information processing device satisfies predetermined conditions or not; a cancel permission detecting unit to, when the information processing device receives from the server device a piece of cutoff cancel permission information indicating that the environment of the information processing device satisfies the predetermined conditions as a result of the determining process via the connection for the determining process, detect that the information processing device receives the cutoff cancel permission information through the communications with the information processing device; and a cutoff canceling unit to, when the cancel permission detecting unit detects that the information processing device receives the cutoff cancel permission information, cancel the cutoff by the communication cutoff unit.

Herein, the term "cutoff of the communications" connotes disabling the information processing device from performing the communications by use of some type of method. The communication cutoff method may involve adopting, e.g., a variety of methods such as a method of intercepting a packet etc transmitted from another information processing device and thus cutting off the communication by not forwarding a cutoff target communication, as well as a method of physically cutting off the communications.

The communication cutoff device according to the present invention may further include a physical address masquerading unit to guide information transmitted from the information processing device to the communication cutoff device by sending a physical address of the communication cutoff device as a response to a query about a physical address of a device other than said information processing device, said query is transmitted by the information processing device, wherein the communication cutoff unit may cut off at least a part of the communications performed by the information processing device by not forwarding at least a part of the guided information.

Moreover, the communication cutoff device according to the present invention cuts off the communications performed by the information processing device connected to the network but, on the other hand, establishes a connection for (redirects) a partial communication with the predetermined server device in order to execute the determining process (e.g., a quarantining process or an authenticating process). The term "redirect" according to the present invention connotes instructing the information processing device to set a connecting destination to the server device for the quarantine in order to execute the determining process such as the quarantining process or the authenticating process, and is exemplified by HTTP (HyperText Transfer Protocol) redirect for giving the instruction of setting the connecting destination a different connecting destination in so-called HTTP communications.

Namely, according to the present invention, the connecting destination of the information processing device becomes the server device for the determining process, whereby this information processing device is quarantined or authenticated. According to the present invention, with this technology being adopted, it is feasible to provide (the technique of) quarantining or authenticating the information processing device within the network only by connecting the communication cutoff device according to the present invention to the network without changing the existing network architecture such as installing a router including the quarantine function, changing the network topology in a way that accompanies this installation or installing the quarantine server into the network.

Furthermore, the determining process may be executed by the server device for the determining process in a way that determines whether the environment of the information processing device satisfies the predetermined conditions or not, and may also be executed in such a way that the information processing device receives the checking contents (the predetermined conditions) for the determination from the server device and determines whether the environment of the self-device meets the predetermined conditions or not. Herein, the "predetermined conditions" are, e.g., conditions that should be satisfied for checking whether or not the environment of the information processing device is in a status recommended in terms of ensuring the security against the infection with the malware, the leakage of the information, etc. and are exemplified, as those to be set, by conditions of keeping the version of the system software of the information processing device in the latest status, applying the security patch, installing the security software and keeping the definition file, the detection engine, etc of the security software in their latest statuses.

In the communication cutoff device according to the present invention, when the server device or the information processing device completes the determining process and if the environment of the information processing device is determined to satisfy the predetermined conditions, the server device issues the cutoff cancel permission information. Herein, in the present invention, the cutoff cancel permission information is not transmitted directly to the communication cutoff device from the server device but is transmitted to the information processing device from the server device via an established connection (e.g., a TCP (Transmission Control Protocol)-based connection) to the server device from the information processing device for the determining process. Thereafter, the communication cutoff device performs the communications with the information processing device receiving the cutoff cancel permission information, thereby detecting that the information processing device receives the cutoff cancel permission information.

Namely, in the present invention, the communication cutoff is canceled not by a scheme that the server device directly notifies the communication cutoff device that the quarantine or the authentication of the target information processing device are completed but by a scheme that the server device issues the cutoff cancel permission information as a so-called cutoff cancel ticket to the information processing device, while the communication cutoff device confirms that the target information processing device holds the ticket (the cutoff cancel permission information). In other words, the quarantine target information processing device receives the issuance of the ticket for permitting the communications in the network from the server device and submits the ticket to the communication cutoff device, thereby enabling the communications with the operation server 50 and other information processing devices.

Therefore, according to the present invention, because of existence of a firewall etc for rejecting the connection to the network on the side of the communication cutoff device from the network on the side of the server device, even in the network where the communications from the server device installed on the external network to the communication cutoff device are hard to be performed, the server device installed on the external network (e.g., an ASP (Application Service Provider) network) can provide a quarantine service, an authentication service, etc without changing the setting of the firewall. Moreover, this configuration is enabled to be attained, and consequently it is possible to reduce the operation cost and the time needed for the installation.

Further, the communication cutoff device according to the present invention may further include: an authentication information receiving unit to receive, from the information processing device, authentication information transmitted from the server device to the information processing device via the connection for the determining process; and an authenticating unit to authenticate the server device based on information contained in the authentication information received by the authentication information receiving unit, wherein the cutoff canceling unit may determine, when the authenticating unit authenticates the server device, that the information processing device receives the cutoff cancel permission information from valid server device, and may thus cancel the cutoff.

The communication cutoff device according to the present invention authenticates the server device by use of the method described above. According to the present invention, this authenticating process, even in such a configuration as in the present invention that the communications between the server device and the communication cutoff device are performed via the quarantine target information processing device, enables the communications related to the quarantine to be conducted more safely by preventing the cutoff cancel permission information from being faked by the quarantine target information processing device. It should be noted that the authentication information issued by the server device may be transmitted and received while being contained in the cutoff cancel permission information.

Still further, the communication cutoff device according to the present invention may further include a challenge transmitting unit to transmit challenge information for authenticating the server device to the information processing device to thereby forward the challenge information to the server device from the information processing device, wherein the authentication information receiving unit may receive, from the information processing device, the authentication information generated based on the challenge information by the server device in a way that uses a predetermined encryption key and transmitted to the information processing device via the connection for the determining process, and the authenticating unit may collate the challenge information extracted from the received authentication information by use of a decryption key corresponding to the predetermined encryption key with the challenge information transmitted by the challenge transmitting unit and, if coincident with each other, may authenticate the server device as the valid server device.

Note that an encryption key and a decryption key corresponding thereto, which are used in the present invention, may be (replaced by) a so-called common key and may be (replaced by) a combination of a secret key and a public key, and the device may be authenticated by other arbitrary authentication systems such as a challenge & response authentication system. In the case of employing the combination of the secret key and the public key, the server device encrypts the challenge information with the secret key, while the communication cutoff device can authenticate the server device by decrypting the encrypted challenge information (the ticket) with the public key.

It should be noted that, in addition to the authentication of the server device described above, or in place of the authentication of the server device by the communication cutoff device described above, the server device may authenticate the communication cutoff device. In this case, for example, the communication cutoff device according to the present invention transmits the authentication information to the information processing device, and gets the information processing device to transmit this authentication information to the server device through the connection for the determining process. Then, the server device authenticates the communication cutoff device based on information contained in the authentication information transmitted by the communication cutoff device and received via the information processing device. Note that the authentication information transmitted by the communication cutoff device may also be information generated by the communication cutoff device based on the challenge information transmitted by the server device and received by the communication cutoff device via the information processing device.

It should be noted that the present invention can be grasped as the invention of a quarantine system, the invention of the quarantine target information processing device or the invention of the server device. For example, the present invention is a server device including: a connection accepting unit to accept a connection from an information processing device, which is redirected by a communication cutoff device which cuts off at least a part of communications performed by the information processing device; a determining unit to acquire an environment of the information processing device via the connection accepted by the connection accepting unit and to determine whether the acquired environment satisfies a predetermined condition or not; and a cutoff cancel permission information transmitting unit to transmit, to the information processing device, if the determining unit determines that the environment of the information processing device satisfies the predetermined condition, cutoff cancel permission information indicating that the cutoff may be canceled via the connection accepted by the connection accepting unit.

Further, the server device according to the present invention may further include an authentication information transmitting unit to transmit the authentication information for undergoing the authentication by the communication cutoff device to the information processing device via the connection accepted by the connection accepting unit, and to transmit the authentication information to the communication cutoff device from the information processing device.

Moreover, the server device according to the present invention may further include: a challenge information receiving unit to receive the challenge information transmitted to the information processing device from the communication cutoff device via the connection accepted by the connection accepting unit; and an authentication information generating unit to generate the authentication information by use of the challenge information and a predetermined encryption key, wherein the authentication information transmitting unit may transmit the authentication information generated by the authentication information generating unit.

Further, the present invention can be grasped as a method executed by a computer or a program to make the computer conduct the execution. Still further, the present invention may also be a recording medium recorded with such a program that can be read by a computer, other devices and machines. Herein, the recording medium readable by the computer etc connotes a recording medium capable of storing information such as data and programs electrically, magnetically, optically, mechanically or by chemical action, which can be read from the computer etc.

According to the present invention, it is feasible to provide quarantining the information processing device within the network in a way that reduces the costs for installing and operating the quarantine server by enabling the quarantine server to be installed on the external network.

DESCRIPTION OF EMBODIMENTS

An embodiment of a quarantine system 1 according to the present invention will hereinafter be described with reference to the drawings.

<System Architecture>

Figure 1:
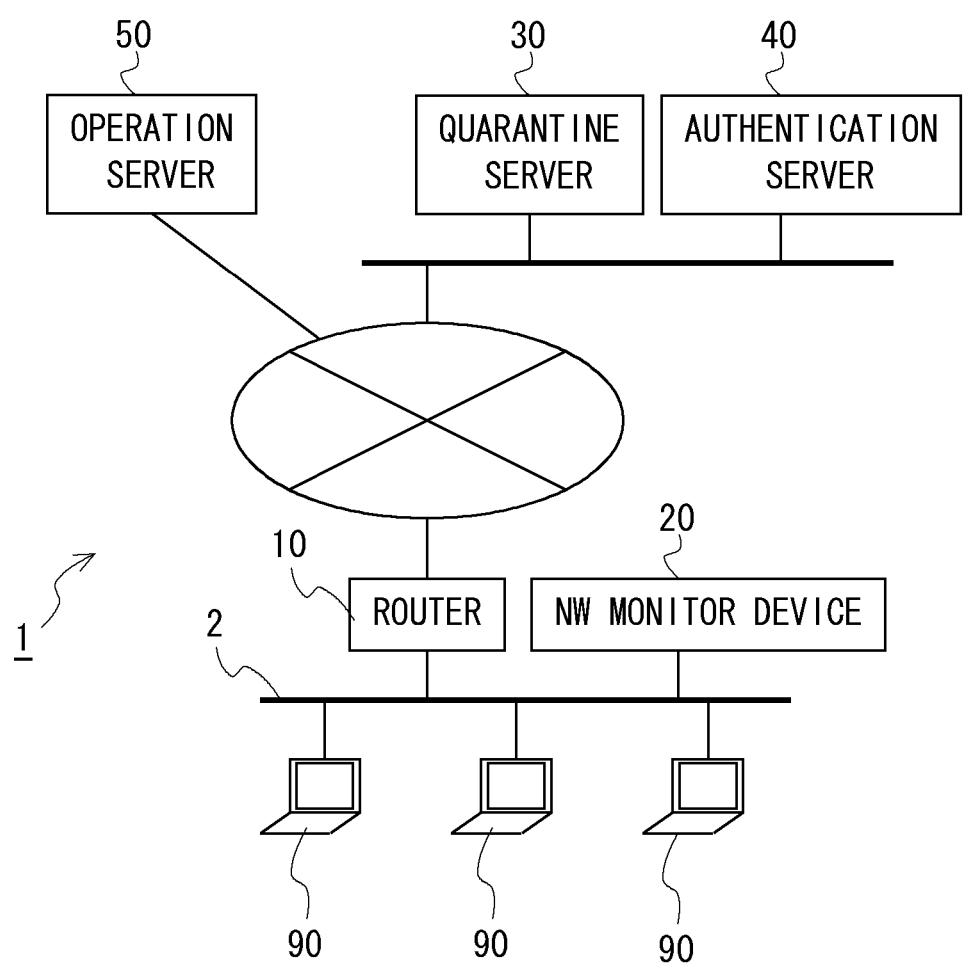
FIG. 1 is a schematic diagram illustrating an architecture of a quarantine system according to an embodiment.

FIG. 1 is a schematic view depicting an architecture of the quarantine system 1 according to the embodiment. The quarantine system 1 according to the embodiment includes a network segment 2 to which quarantine target information processing devices 90 (which will hereinafter be referred to as [quarantine target nodes 90]) are connected, an operation server 50 connecting in a communication-enabled manner with the network segment 2 via a router 10, a quarantine server 30 and an authentication server 40. Then, a network monitor device 20 for cutting off (blocking) communications of the quarantine target node 90, which is not yet completely quarantined, is connected to the network segment 2.

Note that the network monitor device 20 corresponds to a communication cutoff device according to the present invention, and the quarantine server 30 corresponds to a server device according to the present invention. Further, the operation server 50 provides a service for operations to the quarantine target node 90, the quarantine server 30 provides a quarantine service to the quarantine target nodes 90 connected to the network segment 2, and the authentication server 40 authenticates the quarantine target node 90 which connects with the quarantine server 30 or authenticates the network monitor device 20 which gives a connecting instruction to the quarantine target node 90 to connect with the quarantine server 30.

It should be noted that in the quarantine system according to the embodiment, the variety servers, to which the quarantine target nodes 90 are connected, are the servers connected at remote places via the Internet or a wide area network (WAN), and provided by, e.g., ASP (Application Service Provider). However, these servers are not necessarily connected at the remote places. For example, these servers may also be connected on a local network where the quarantine target nodes 90 and the network monitor device 20 exist.

Figure 2:
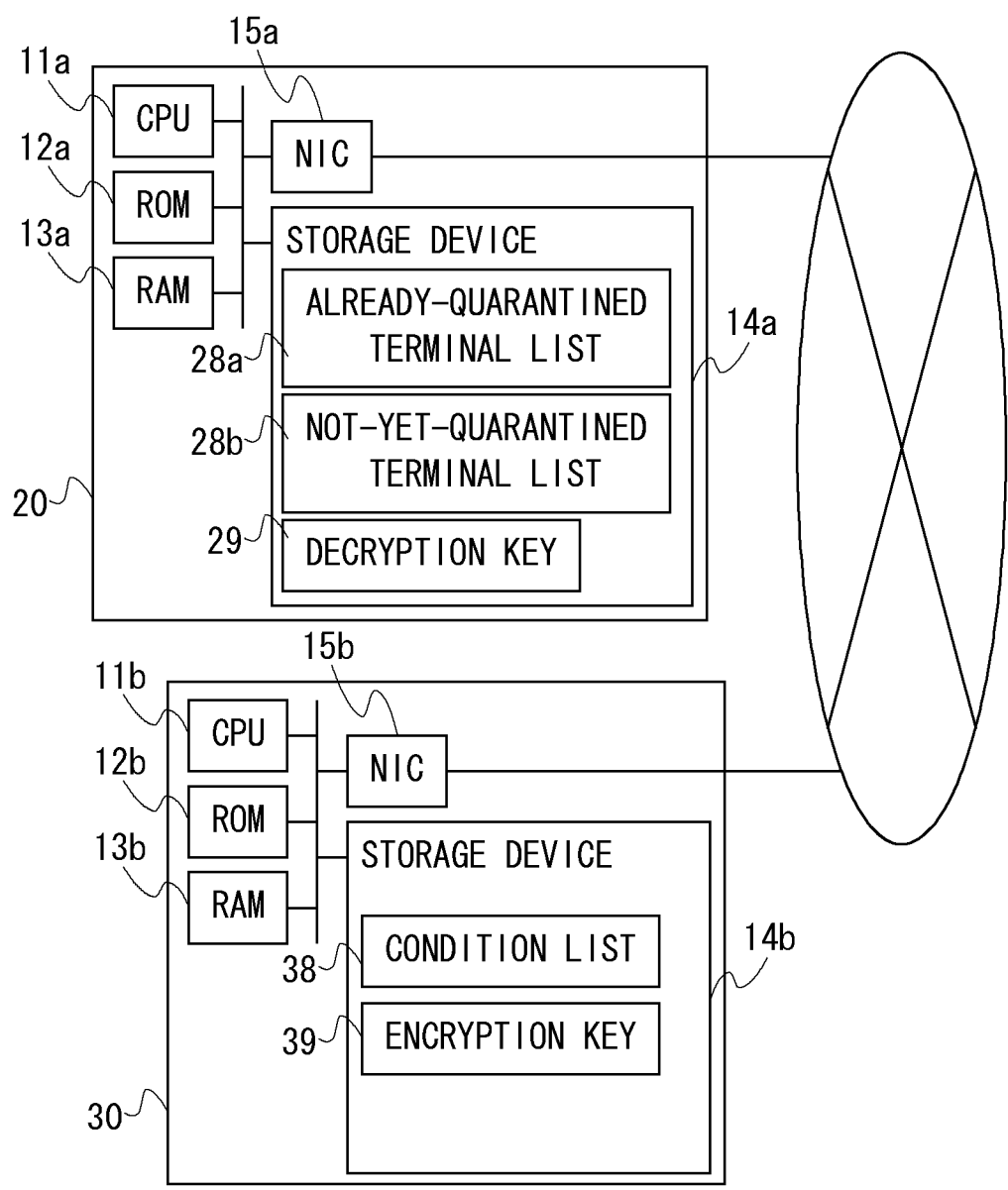
FIG. 2 is a diagram illustrating hardware configurations of a network monitor device and a quarantine server according to the embodiment.

FIG. 2 is a diagram illustrating hardware configurations of the network monitor device 20 and the quarantine server 30 according to the embodiment. Note that the illustrations of the components (the router 10, the quarantine target nodes 90, the operation server 50 and the authentication server 40) other than the network monitor device 20 and the quarantine server 30 are omitted in FIG. 2. The network monitor device 20 and the quarantine server 30 are computers which respectively include CPUs (Central Processing Units) 11a, 11b, RAMS (Random Access Memories) 13a, 13b, ROMs (Read Only Memories) 12a, 12b, storage devices 14a, 14b such as EEPROMs (Electrically Erasable and Programmable Read Only Memories) or HDDs (Hard Disk Drives), and communication units such as NICs (Network Interface Cards) 15a, 15b.

Herein, the storage device 14a of the network monitor device 20 is recorded with, in addition to a program for controlling the network monitor device 20, an already-quarantined terminal list 28a and a not-yet-quarantined terminal list 28b. Pieces of information for identifying the terminals, which are completely quarantined by the quarantine server 30 and permitted to establish the connection to the operation server 50 and other information processing devices 90, are listed in the already-quarantined terminal list 28a, while pieces of information for identifying the terminals, of which the communications on the network should be blocked by the network monitor device 20 because the quarantine server 30 does not yet complete the quarantine though a "challenge" (for re-quarantine) has been issued, are listed in the not-yet-quarantined terminal list 28b. A scheme of the embodiment is that the already-quarantined terminal list 28a and the not-yet-quarantined terminal list 28b have records of MAC (Media Access Control) addresses of the quarantine target nodes 90 (the information processing devices 90), thereby identifying the already-quarantined terminals and the not-yet-quarantined terminals.

Further, the storage device 14b of the quarantine server 30 is recorded with a condition list 38 in addition to the program for controlling the quarantine server 30. The condition list 38 is accumulated with conditions (e.g., a system condition of the quarantine target node 90, a version condition of the system software, recommended setting contents of the system, a condition of security software, a version condition of a definition file, a version condition of a detection engine, etc.) for determining whether or not mainly a security-related environment of the quarantine target node 90 satisfies a predetermined security policy enabling participation in the network and the connection to the operation server 50 to be permitted.

Further, the storage device 14b of the quarantine server 30 is recorded with an encryption key 39 for generating authentication information (a ticket) by encrypting the "challenge" which will be described later on, while the storage device 14a of the network monitor device 20 is recorded with a decryption key 29 for decrypting this authentication information (the ticket). The network monitor device 20 according to the embodiment decrypts, with the decryption key 29, the ticket generated in such a way that the quarantine server 30 encrypts the challenge with the encryption key 39, and verifies a decryption result, thus authenticating the quarantine server 30.

Figure 3:
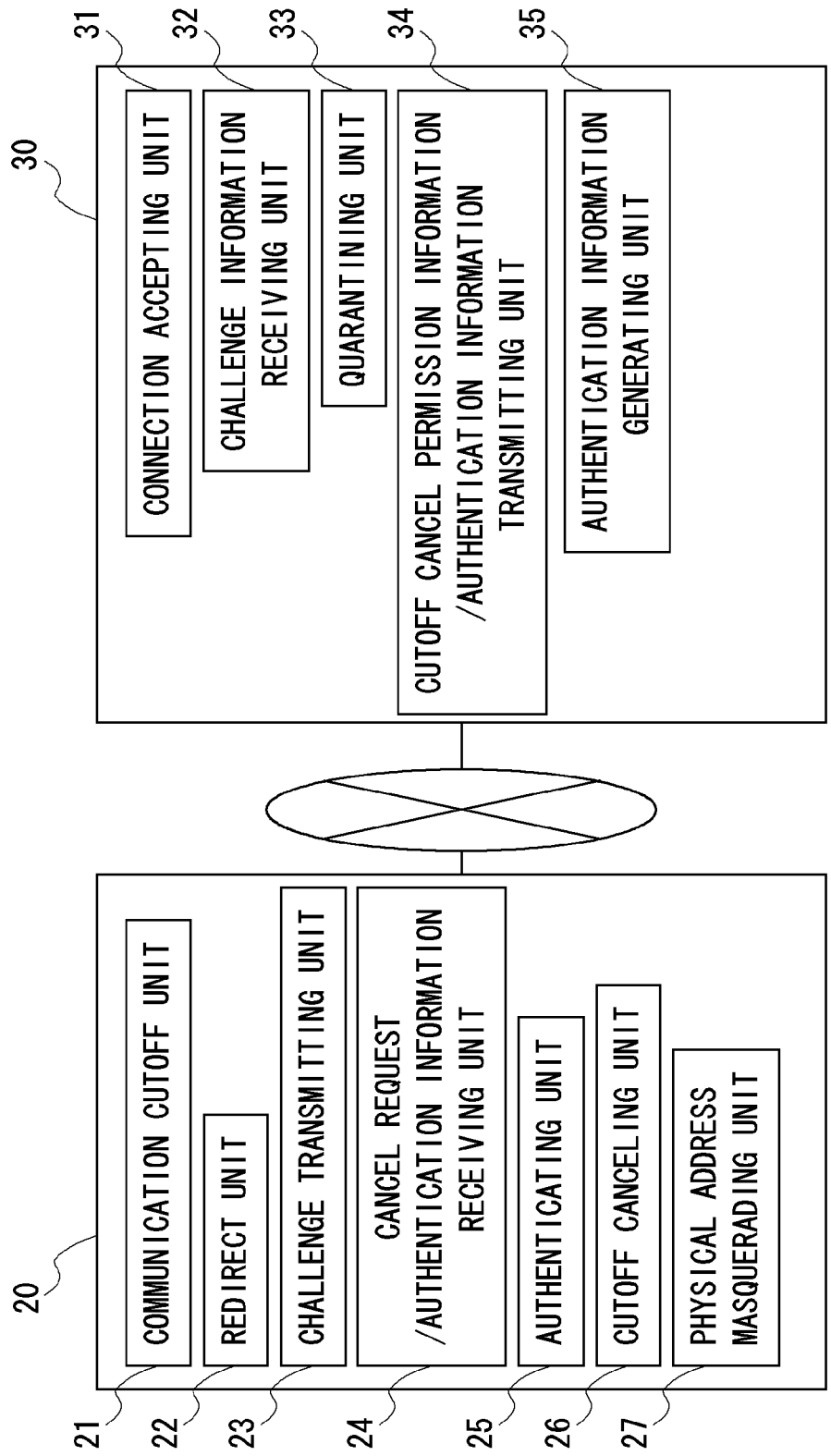
FIG. 3 is a diagram illustrating outlines of functional configurations of the network monitor device and the quarantine server according to the embodiment.

FIG. 3 is a diagram illustrating outlines of functional configurations of the network monitor device 20 and the quarantine server 30 according to the embodiment. Note that FIG. 3 omits the illustrations of the components (the router 10, the quarantine target nodes 90, the operation server 50 and the authentication server 40, etc) other than the network monitor device 20 and the quarantine server 30. The network monitor device 20, when the programs recorded in the storage device 14a are read into the RAM 13a and executed by the CPU 11a, functions as a communication cutoff device including a communication cutoff unit 21, a redirect unit 22, a challenge transmitting unit 23, a cancel request/authentication information receiving unit 24, an authenticating unit 25, a cutoff canceling unit 26 and a physical address masquerading unit 27. It should be noted that the respective functions held by the communication cutoff device are executed by the CPU 11a defined as a general-purpose processor, however, a part or the whole of these functions may be executed by one or a plurality of dedicated processors in the embodiment.

Furthermore, the quarantine server 30, when the programs recorded in the storage device 14b are read into the RAM 13b and executed by the CPU 11b, functions as a server device including a connection accepting unit 31, a challenge information receiving unit 32, a quarantine unit 33, a cutoff cancel permission information/authentication information transmitting unit 34 and an authentication information generating unit 35. Note that the respective functions held by the server device are executed by the CPU 11b defined as the general-purpose processor, however, a part or the whole of these functions may be executed by one or a plurality of dedicated processors in the embodiment.

<Flow of Process>

Next, a flow of processes executed by the quarantine system 1 according to the embodiment will hereinafter be described with reference to a flowchart.

Figure 4:
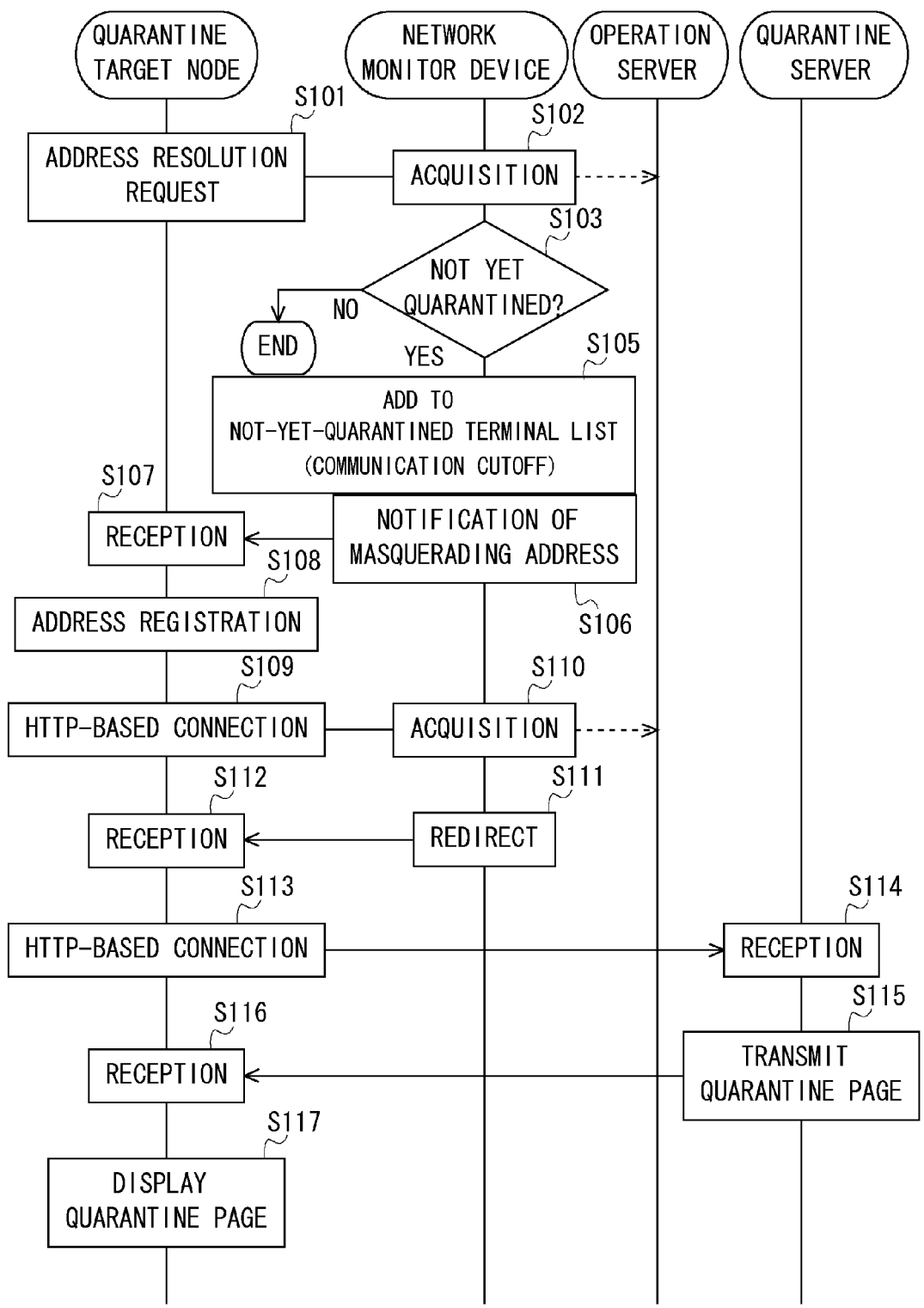
FIG. 4 is a flowchart illustrating a flow of a pre-quarantining process according to the embodiment.

FIG. 4 is a flowchart illustrating a flow of a pre-quarantining process according to the embodiment. A start of the pre-quarantining process according to the embodiment is triggered by such an event that the quarantine target node 90 (the information processing device 90) of a user participates in the network segment 2 in the quarantine system 1 discussed above. Specific contents of the process and a processing sequence illustrated in the flowchart are given by way of one example for carrying out the present invention. The specific contents of the process and the processing sequence may be properly selected according to the embodiment of the present invention.

The quarantine target node 90 participating in the network broadcasts an ARP (Address Resolution Protocol)-based address resolution request in order to perform the communications with a want-to-communicate terminal (e.g., the operation server 50) (step S101). Herein, if in the case of a general type network, the operation server 50 exists outside the network segment 2, and hence it follows that the router 10 notifies of a MAC address of the self-device (the router 10). In the network architecture according to the embodiment, however, the network monitor device 20 is connected to the network segment 2 and notifies the quarantine target node 90 of the MAC address of the self-device (the network monitor device 20) in response to the address resolution request broadcasted by the quarantine target node 90.

Specifically, the network monitor device 20 acquires all of packets including those not addressed to the MAC address of the self-device, which flow on the network segment 2 (step S102), and collates a source MAC address of the acquired packet with the MAC address retained in the already-quarantined terminal list 28*a* (step S103). As a result of the collation, if the source MAC address of the acquired packet is not contained in the already-quarantined terminal list 28*a*, the communication cutoff unit 21 records the MAC address of the sender terminal in the not-yet-quarantined terminal list 28*b* (step S105), and the physical address masquerading unit 27 transmits, as an ARP reply, the MAC address of the network monitor device 20 back to the sender terminal (step S106).

Namely, the MAC address transmitted herein as the ARP reply back to the sender terminal masquerades a MAC address of a default router or another terminal within the network segment 2 with the MAC address of the network monitor device 20. Therefore, according to the network monitor device 20 related to the embodiment, it follows that the quarantine target node 90, which is not yet quarantined, registers in the address list the MAC address of the network monitor device 20 as the MAC address of the operation server 50 or another terminal within the network segment 2 (step S108).

Hence, it follows that the quarantine target node 90, which is not yet quarantined, in the case of trying to access the operation server 50 or another terminal within the network segment 2, transmits the packet to the MAC address masqueraded by the network monitor device 20. Then, the network monitor device 20 discards in general the packet transmitted from the quarantine target node 90 registered in the not-yet-quarantined terminal list 28*b*, except the communications necessary for the quarantine that will be explained later on. In other words, the communication cutoff unit 21 of the network monitor device cuts off the communications of the quarantine target node 90, which is not yet quarantined, by the method described above.

Note that the network monitor device 20 transmits, it is desirable, the ARP reply for masquerading a plural number of times at a time interval in order to prevent the MAC address of the authorized communication partner device from being retained in the access list held by the quarantine target node 90, which is not yet quarantined.

The redirect unit 22 of the network monitor device 20, if the communications acquired from the quarantine target node 90 of which the communications remain blocked are HTTP (HyperText Transfer Protocol)-based communications, redirects the communications so that quarantine target node 90 connects with the quarantine server 30 irrespective of the communication partner device designated in an HTTP connection request (steps S109 through S111). The quarantine target node 90, upon receiving a redirect request, connects with the predetermined quarantine server 30 which the network monitor device 20 notifies of (steps S112, S113). Incidentally, on this occasion, the MAC address of the network monitor device 20 is set in a "destination MAC address" of the packet transmitted from the quarantine target node 90, however, the network monitor device 20 not cuts off (not discards) but forwards the packet of which a destination IP address is set to the quarantine server 30.

Hereafter, during the quarantine target node 90 remains recorded in the not-yet-quarantined terminal list 28*b*, the network monitor device 20 forwards the packet of which the destination IP address is set to the quarantine server 30 but discards (blocks the communications), without forwarding, the packets other than the forwarded packet. The process such as this enables the quarantine target node to receive a quarantine service while ensuring the security in the network segment 2. It should be noted that the embodiment may, though the determination as to whether the packet transfer is required or not is made by referring to the destination IP address, involve adopting other methods. For example, the determination as to whether the packet transfer is required or not may also be made by referring to a type of the communication protocol, a port number, URL (Uniform Resource Locator), etc in addition to the destination IP address.

The connection accepting unit 31 of the quarantine server 30 receives the redirected HTTP connection, and the quarantine server 30 transmits a Web page for the quarantine to the quarantine target node 90 (steps S114, S115). Hereafter, the data transmission from the quarantine server 30 is conducted via a TCP (Transmission Control Protocol)-based connection to the connection accepting unit 31 of the quarantine server 30 from the quarantine target node 90, and hence the quarantine target node 90, even when a setting of not accepting the connection from an external network is done in the router 10 etc, can receive the communications from the quarantine server 30.

The quarantine target node 90 receiving the Web page for the quarantine displays this Web page for the quarantine (steps S116, S117). In the quarantine system 1 according to the embodiment, the Web page for the quarantine contains input fields for inputting items of authentication information (such as a user ID and a password) for authenticating the user of the quarantine target node 90 or authenticating the quarantine target node 90, and the user makes a request for the authentication by inputting the authentication information in a way that uses an input device (a keyboard, a mouse, etc) of the quarantine target node 90. Depending on the embodiment, however, the authentication method may involve adopting other methods, and the authentication may not be carried out.

Figure 5:
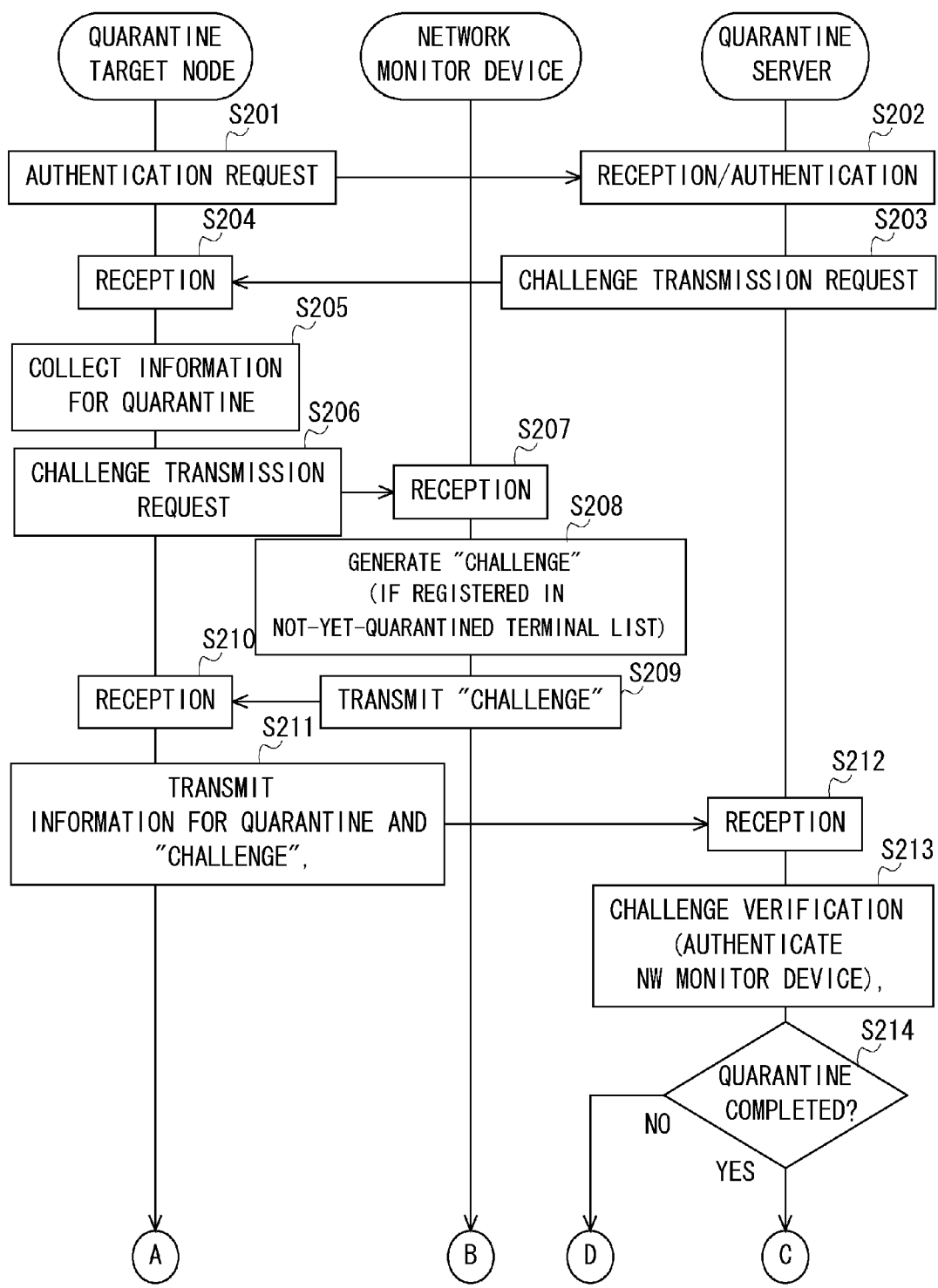
FIG. 5 is a flowchart (A) illustrating a flow of a quarantining process according to the embodiment.
Figure 6:
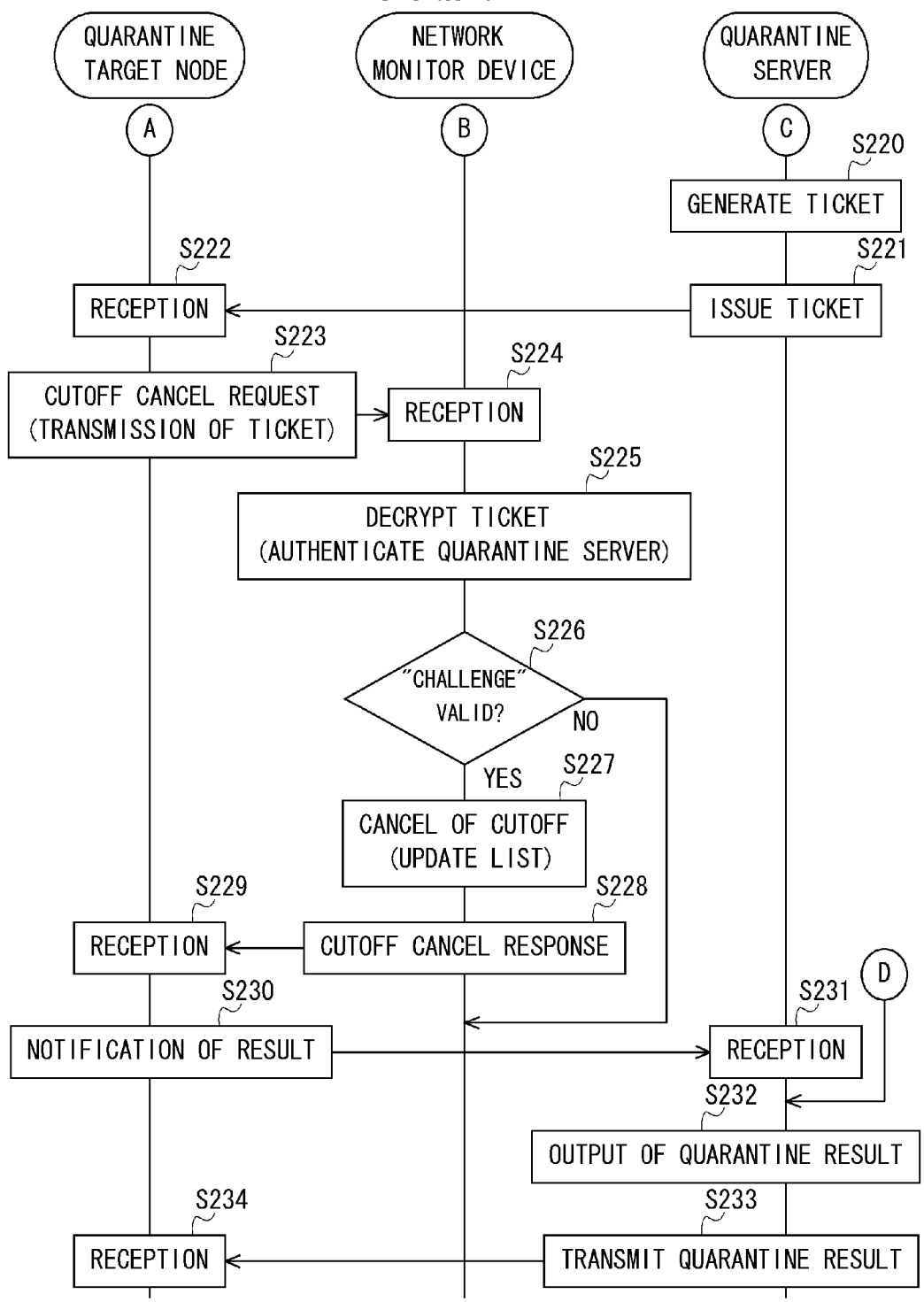
FIG. 6 is a flowchart (B) illustrating the flow of the quarantining process according to the embodiment.

FIGS. 5 and 6 are flowcharts each illustrating a flow of the quarantine process according to the embodiment. A start of the quarantine process according to the embodiment is triggered by such an event that the user inputs the information for the authentication to the Web page for the quarantine displayed by the quarantine target node 90. Note that specific contents of the process and a processing sequence illustrated in the flowcharts are given by way of one example for carrying out the present invention. The specific contents of the process and the processing sequence may be properly selected according to the embodiment of the present invention.

The quarantine target node 90 transmits, to the quarantine server 30, an authentication request (and a quarantine request) containing the authentication information (the user ID, the password, etc) inputted by the user (step S201). The quarantine server 30 receiving the authentication request refers to the authentication server 40 for the authentication information such as the user ID and the password contained in the received authentication request, thereby authenticating the user or the quarantine target node 90 (step S202).

Upon completing the authentication of the user or the quarantine target node 90, the quarantine server 30 transmits, to the quarantine target node 90, a challenge transmission request for transmitting the "challenge" (step S203). The challenge transmission request contains data used for the network monitor device 20 to generate the "challenge" (which will hereinafter be referred to as the [challenge generating data]). The quarantine target node forwards the challenge transmission request to the network monitor device 20, and the network monitor device 20 receiving the forwarded challenge transmission request generates the "challenge" by encrypting the challenge generating data with a common key shared beforehand with the quarantine server 30 (steps S206 through S208). Note that the "challenge" is generated in step S208 only when the quarantine target node 90 is recorded in the not-yet-quarantined terminal list 28b. With this scheme, it is feasible to prevent the "challenge" transmitted in the past from being retransmitted.

Note that the quarantine target node 90 collects the quarantine information (which will hereinafter be also termed an [inventory]) (step S205). Timing when the quarantine target node 90 collects the inventories is not, however, limited to the timing exemplified in the flowchart. It is sufficient that the inventory is collected till transmitted to the quarantine server 30, and it is therefore preferable that the inventory collecting timing is properly determined corresponding to the embodiment in the flow of the entire quarantine process.

The challenge transmitting unit 23 of the network monitor device 20, when generating the "challenge", transmits the generated "challenge" to the quarantine target node 90 (step S209). Then, the quarantine target node 90 transmits, together with the received "challenge", the inventories collected in step S205 to the quarantine server 30 (steps S210, S211). Namely, in the embodiment, the "challenge" is transmitted via the quarantine target node 90 to the quarantine server 30 from the network monitor device 20.

When the challenge information receiving unit 32 of the quarantine server 30 receives the inventory and the "challenge", the quarantine server 30 verifies the "challenge" (steps S212, S213). To be specific, the quarantine server 30 decrypts the "challenge" with the common key, which is generated by the network monitor device 20, and collates the decrypted "challenge" with the challenge generating data transmitted in the challenge transmission request in step S203, thus checking validity of the network monitor device 20 which involves an intermediary of the quarantine target node 90.

When the validity of the network monitor device 20 is checked (confirmed), the quarantine unit 33 of the quarantine server 30 checks the contents of the inventory received in step S212, thereby quarantining the quarantine target node 90. Specifically, it is determined whether the communication cutoff currently applied to the quarantine target node 90 may be cancelled or not by checking whether various items of information (e.g., the system information of the quarantine target node 90, the version information of the system software, the setting contents of the system, the security software information, the version information of the definition file, the version information of the detection engine, etc.) contained in the inventory (the quarantine information) and related to the environment of the quarantine target node 90, satisfy the predetermined conditions given in the condition list 38 or not (step S214). As a result of the determination, in the case of determining that the environment of the quarantine target node 90 satisfies the predetermined conditions, the quarantine is completed. Further, as a result of the determination, in the case of determining that the environment of the quarantine target node 90 does not satisfy the predetermined conditions, the quarantine is not validated. A ticket, which will be described later on, is not generated.

Note that the quarantine may involve adopting the variety of methods other than the method explained above. For example, such a method may be adopted that the various items of information contained in the inventory (the quarantine information) and related to the environment of the quarantine target node 90 are compared with the predetermined conditions given in the condition list 38, then a security level of the client is calculated based on a comparative result, and, if the security level is equal to or higher than a predetermined level, the environment of the quarantine target node 90 is determined to satisfy the predetermined conditions.

Upon completing the quarantine, the authentication information generating unit 35 of the quarantine server 30 encrypts data organized by combining the received "challenge" with cutoff cancel permitting information by use of the common key, thus generating the ticket (step S220). Herein, the ticket is a ticket issued by the quarantine server 30 to the quarantine target node and serving to permit the communications with the operation server 50 and other information processing devices 90 in the network segment 2. The ticket contains the cutoff cancel permitting information indicating that the quarantine is completed, i.e., indicating that the communication cutoff of the quarantine target node 90 by the network monitor device 20 may be canceled. Further, the ticket performs a role as a response to the "challenge" transmitted from the network monitor device 20 via the quarantine target node 90.

When the ticket is generated, the cutoff cancel permission information/authentication information transmitting unit 34 of the quarantine server 30 transmits (issues) the generated ticket to the quarantine target node (step S221). Note that the ticket transmitting process is executed via a TCP (Transmission Control Protocol)-based connection to the connection accepting unit 31 of the quarantine server 30 from the quarantine target node 90, and hence the quarantine target node 90, even when the setting of not accepting the connection from the external network is done in the router 10 etc, can receive the communications from the quarantine server 30, which is as described with reference to FIG. 4.

The quarantine target node 90 receives the ticket transmitted (issued) by the cutoff cancel permission information/authentication information transmitting unit 34 of the quarantine server 30, and transmits a communication cutoff cancel request containing the ticket to the network monitor device 20 (steps S222, S223). When the cancel request/authentication information receiving unit 24 of the network monitor device 20 receives the communication cutoff cancel request containing the ticket, the authenticating unit 25 of the network monitor device 20 decrypts the ticket with the common key, thereby extracting the "challenge" and the cutoff cancel permission information, which are contained in the ticket (steps S224, S225).

Then, the authenticating unit 25 compares the "challenge" contained in the information acquired as a result of the decryption with the "challenge" generated and transmitted in steps S208, S209, thus checking the validity of the quarantine server 30 which has issued the ticket (step S226). As a result of the comparison, if the "challenge" decrypted from the ticket is identical with the "challenge" generated in step S208, the authenticating unit 25 determines that the ticket received in step S224 is the ticket issued by the valid quarantine server 30. Note that as the result of the comparison, whereas if the "challenges" are not coincident with each other, the authenticating unit 25 determines that the ticket received in step S224 is faked, and continues the communication cutoff status with respect to the quarantine target node 90.

In the case of determining that the ticket is issued by the valid quarantine server 30, the cutoff canceling unit 26 of the network monitor device 20 refers to the cutoff cancel permission information acquired as the result of the decryption in step S225, and cancels the communication cutoff (step S227). To be specific, the cutoff canceling unit 26 deletes the MAC address of the quarantine target node 90 from the not-yet-quarantined terminal list 28b and adds the MAC address of the quarantine target node 90 to the already-quarantined terminal list 28a. Then, hereafter, neither the ARP masquerading nor the packet discard (the communication cutoff) is conducted with respect to the quarantine target node 90 that has been completed quarantined.

When the communication cutoff is canceled, the network monitor device 20 transmits, to the quarantine target node 90, a cutoff cancel response for notifying that the communication cutoff is canceled (step S228). The quarantine target node 90 receives this cutoff cancel response and thus can know that the communication cutoff is canceled according to the cancel request transmitted in step S223 (step S229). Further, when the cancel of the communication cutoff is completed, the quarantine target node 90 notifies the quarantine server 30 of the result (steps S230, S231). Moreover, the network monitor device 20, when the communication cutoff is canceled, notifies the quarantine target node 90 of the valid MAC address of the masqueraded destination (e.g., the operation server or another information processing device).

The quarantine server 30 outputs, to a log, a result of the determination as to whether or not the environment of the quarantine target node 90 satisfies the predetermined conditions (step S232), and transmits the information as the Web page to the quarantine target node 90 (steps S233, S234).

According to the quarantine system 1 related to the embodiment, the information processing devices (the quarantine target nodes 90) within the network can be quarantined without changing the configuration (a change of the router, the installation of the server, etc) of the network segment 2 simply by connecting the network monitor device 20 with the network. Further, in the quarantine system 1 according to the embodiment, the communications for the quarantine process are performed via the established TCP-based connection to the quarantine server from the quarantine target node 90, and the communications between the quarantine server 30 and the network monitor device 20 are also performed via this TCP-based connection. This configuration according to the embodiment has no necessity for changing the setting of the router 10 so as to accept the connection from the outside in order to permit the connection to the network monitor device 20 from the quarantine server 30. Namely, according to the embodiment, the quarantine system 1 can be introduced without decreasing the security of the local network (which is herein the network segment 2).

In addition, the scheme according to the embodiment is not that the network monitor device 20 performs the communications for the quarantine process actively and directly with the quarantine server 30 but that the quarantine target node 90 is made to establish the connection for the quarantine process, whereby the loads on the network and on the network monitor device 20 are less than by the conventional quarantine system 1. Further, according to this type of mechanism, the network monitor device 20 is not required to include the intricate functions provided in the conventional quarantine router, and therefore the quarantine system can be introduced by the devices that are advantageous in terms of costs.

It should be noted that the conventional quarantine system adopts the method of monitoring the communications flowing from the information processing device with its quarantine being completed and, if the communications are not conducted for the fixed period of time, automatically canceling the quarantine-completed status (re-cutting off the communications). In the conventional quarantine system, this mechanism realizes an operation flow such as continuously permitting, when the quarantine is once completed, the use of the network during the operation and, when going to the office next day after returning home, requiring the quarantine once again because the communications were not performed for the fixed period of time. In the quarantine system 1 according to the embodiment, however, the communications flowing from the quarantine target information processing device 90 are guided during only the quarantine process due to the ARP masquerading, and it is therefore difficult for the network monitor device 20 to monitor the communications of the information processing device 90 registered in the already-quarantined terminal list 28*a* after completing the quarantine. It is to be noted that a method of setting an entry-enabled valid period in the already-quarantined terminal list 28*a* and re-cutting off the communications by deleting the information processing device 90 from the already-quarantined terminal list 28*a* after an elapse of the valid period, has a possibility in which the communications might be interrupted abruptly during the operation.

In view of such a problem, the scheme of the quarantine system 1 according to the embodiment is that in the result-of-quarantine communications in step 5233 described above, the information processing device 90 with its quarantine being completed is notified of the address of the network monitor device 20, and the information processing device 90 periodically transmits a specific communication (signal) (which is a so-called heartbeat) to the network monitor device 20. It may be sufficient that the address of which the network monitor device 20 notifies the already-quarantined information processing device 90 is an address enabling the network monitor device 20 to be notified of a predetermined message. For instance, the network monitor device 20 can be notified of the IP address, the MAC address, the URL, etc.

Figure 7:
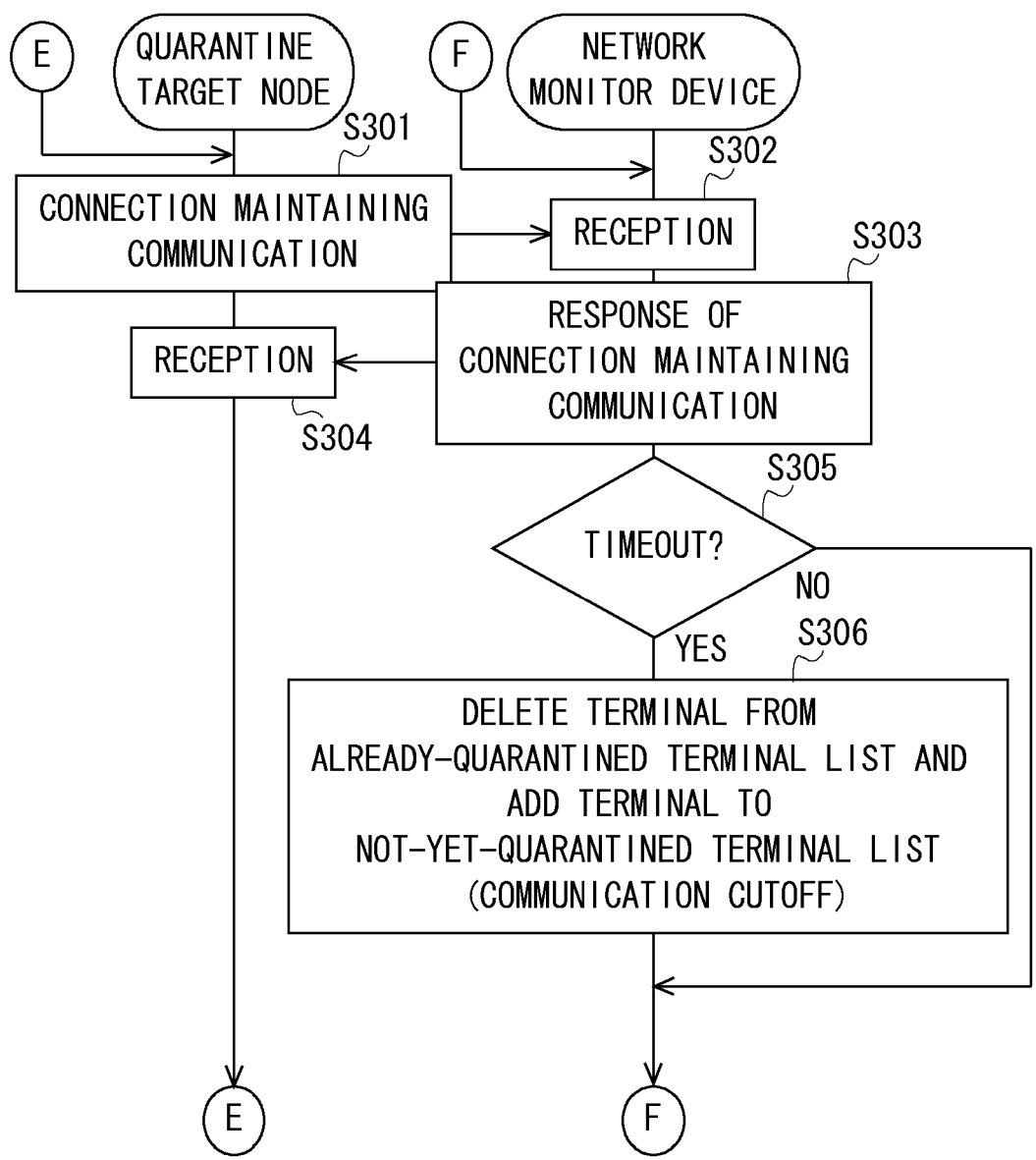
FIG. 7 is a flowchart illustrating a flow of a connection maintaining process according to the embodiment.

FIG. 7 is a flowchart illustrating a flow of a connection maintaining process according to the embodiment. A start of the connection maintaining process according to the embodiment is triggered by such an event that the quarantine process explained with reference to FIG. 5 and is terminated and the communication cutoff of the quarantine target node 90 (the information processing device 90) is canceled. Note that specific contents of the process and the processing sequence illustrated in the flowchart are given by way of one example for carrying out the present invention. The specific contents of the process and the processing sequence may be properly selected according to the embodiment of the present invention.

The quarantine target node 90 (which is, in the already-quarantined status) performs a connection maintaining communication periodically (at an interval of, e.g., 5 min) with the network monitor device 20 with respect to a notification destination address notified in step S233 (step S301). Then, the network monitor device 20 receiving the connection maintaining communication transmits a connection maintaining communication response to the information processing device 90, thus notifying the information processing device 90 that the already-quarantined status continues (steps S302 through S304).

Then, if the information processing device 90 registered in the already-quarantined terminal list 28*a* continues to be in a reception-disabled status of the connection maintaining communication for a fixed period of time (e.g., 30 min) or longer, the network monitor device 20 presumes that the information processing device 90 does not perform the communication, then deletes the relevant information processing device 90 from the already-quarantined terminal list 28*a* and adds this information processing device 90 to the not-yet-quarantined terminal list 28*b* (steps S305 and S306). The information processing device 90 deleted from the already-quarantined terminal list 28*a* is again ARP-masqueraded and undergoes the application of the communication cutoff.

According to the connection maintaining process such as this, the quarantine system using the ARP masquerading as in the case of the quarantine system 1 according to the embodiment can realize the operation flow enabling the periodic quarantine and causing a small amount of stress to the user such as continuously permitting the information processing device 90 with its quarantine being once completed to use the network during the operation of this information processing device 90 and, when the user goes to the office next day after returning home, requiring the quarantine once again.

Figure 8:
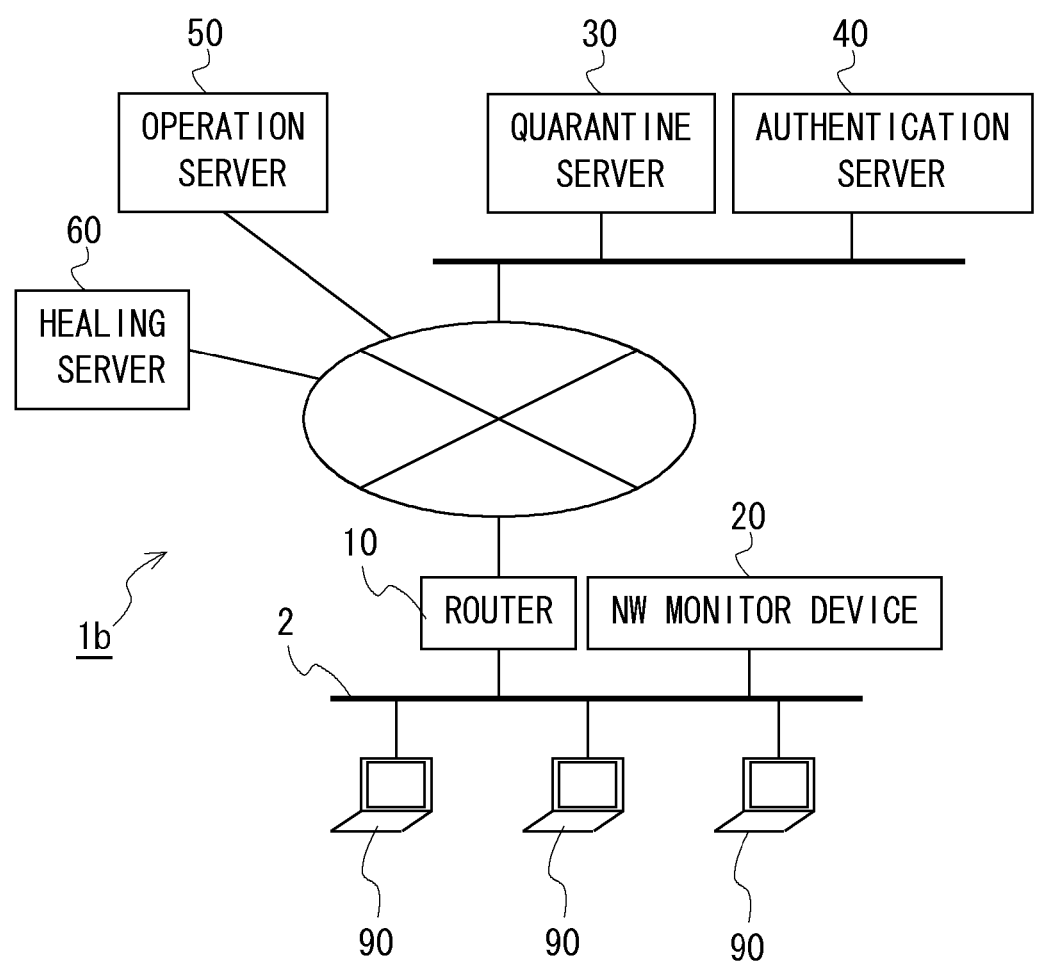
FIG. 8 is a diagram illustrating an embodiment of the quarantine system which does not cut off communications to a healing server in addition to the quarantine server.
Figure 9:
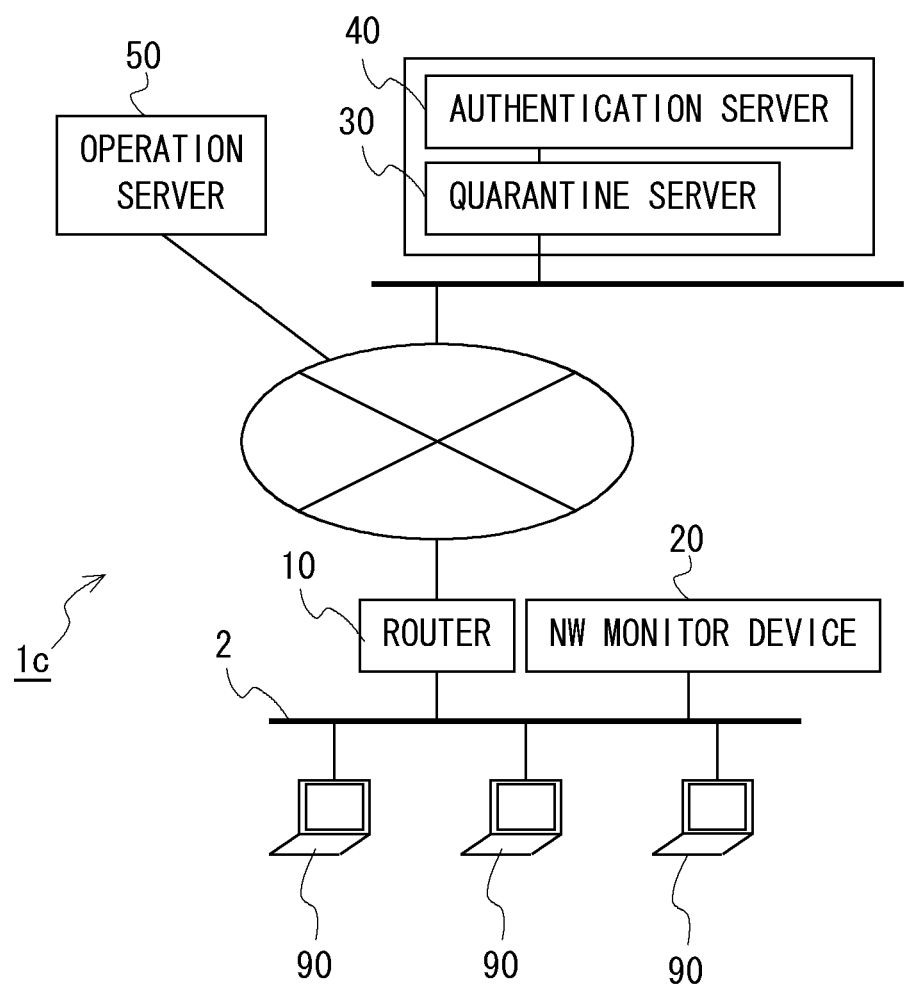
FIG. 9 is a diagram illustrating an embodiment of the quarantine system in which the quarantine server and an authentication server reside together in a single computer.
Figure 10:
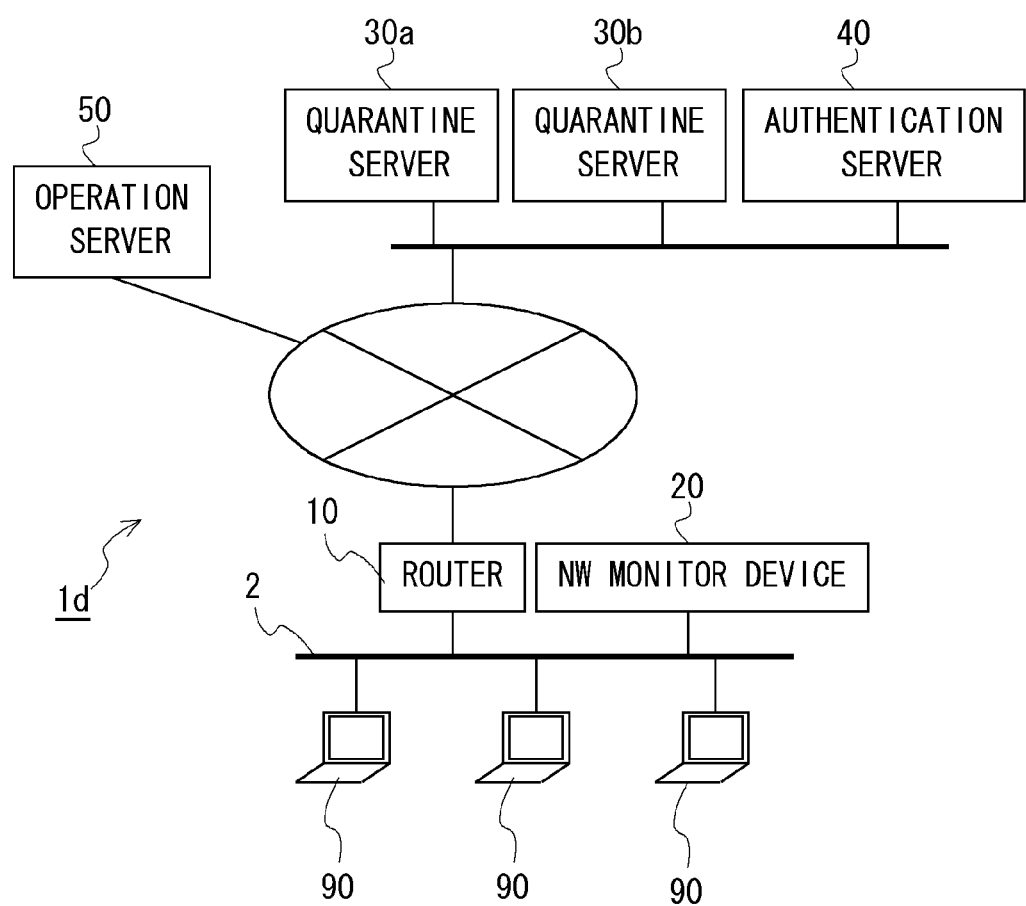
FIG. 10 is a diagram illustrating an embodiment of the quarantine system including the quarantine servers in a redundant configuration.

Next, variations of the network architecture of the quarantine system will hereinafter be described. FIGS. 8 through 10 are diagrams illustrating the variations of the network architecture that may be adopted for carrying out the present invention. In FIGS. 8 through 10, the same components as those in the embodiment discussed above are marked with the same numerals and symbols, and the explanations thereof are omitted.

FIG. 8 is a diagram illustrating an embodiment of a quarantine system 1b which does not cut off the communications flowing to a healing server 60 in addition to the quarantine server 30. In the embodiment, the network monitor device 20 redirects, to the quarantine server 30, the HTTP communication in the communications performed by the quarantine target node 90 that is not yet quarantined, and cuts off other communications, however, in addition to this cutoff rule, such a cutoff rule may also be adopted as not to cut off the connection with the pre-designated healing server 60.

Herein, the healing server 60 is a server that is desirable to permit the communication for improving the security environment of the quarantine target node 90 or for healing the environment that is unsatisfactory for passing the quarantine. This type of healing server 60 can be exemplified by a server which provides an updated piece of system software, a server which provides an updated piece of security software and the latest definition file, and so on. The quarantine target node 90 is permitted to perform the communication with the healing server 60 such as this and is thereby enabled to, even if disabled from passing the quarantine, heal the defectiveness in terms of the security and complete the quarantine by undergoing the quarantine once again.

Further, FIG. 9 is a diagram illustrating an embodiment of a quarantine system 1c in which the quarantine server 30 and the authentication server 40 reside together in the single computer. The embodiment adopts a configuration that the computers independent of each other are connected as the quarantine server 30 and the authentication server 40 via the network, however, a configuration, which may be adopted as a substitute for this configuration, is that the quarantine server 30 and the authentication server 40 reside together in the single computer.

Moreover, FIG. 10 is a diagram depicting an embodiment of a quarantine system 1d in which the quarantine server 30 takes a redundant configuration (30a, 30b). On the occasion of carrying out the present invention, the respective servers from the quarantine server 30 down may take the redundant configuration. For example, a scheme is that a plurality of quarantine servers 30a, 30b each capable of providing the same quarantine service is prepared, and, if the main quarantine server 30a stops operating, a redirect destination of the quarantine target node 90 is switched over to the auxiliary quarantine server 30b, whereby the quarantine service can be continuously provided even when a fault occurs in the quarantine server 30a.

Note that the redundant server switchover method may involve adopting a method of switching over the redirect destination by the network monitor device 20 which detects the fault by periodically monitoring the operation of the server, and may also involve adopting a method by which the same IP address is allocated to the plurality of quarantine servers 30a and 30b, the statuses of these quarantine servers 30a, 30b are mutually monitored and, if the fault occurs in one quarantine server, the connection to the IP address of the quarantine server is taken over by the other quarantine server. For others, the server redundancy method can involve adopting the variety of methods.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such example in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A communication cutoff device comprising:
a communication cutoff unit to cut off at least a part of communications performed by an information processing device;
a redirect unit to make said information processing device establish a logical connection, to a server device, for a determining process of determining whether an environment of said information processing device satisfies predetermined conditions or not;
a cancel permission detecting unit to, when said information processing device receives from said server device a piece of cutoff cancel permission information indicating that the environment of said information processing device satisfies the predetermined conditions as a result of the determining process via the logical connection which is established between the server device and the information processing device for the determining process, detect that said information processing device receives the piece of cutoff cancel permission information through the part of communications with said information processing device;
a cutoff canceling unit to, when said cancel permission detecting unit detects that said information processing device receives the piece of cutoff cancel permission information, cancel the cutoff by said communication cutoff unit;
an authentication information receiving unit to receive, from said information processing device, authentication information transmitted from said server device to said information processing device via the logical connection for the determining process;
an authenticating unit to authenticate said server device based on information contained in the authentication information received by said authentication information receiving unit; and
a challenge transmitting unit to transmit challenge information for authenticating said server device to said information processing device to thereby forward the challenge information to said server device from said information processing device, wherein
said cutoff canceling unit determines, when said authenticating unit authenticates said server device, that said information processing device receives the piece of cutoff cancel permission information from a valid server device, and thus cancels the cutoff,
said authentication information receiving unit receives, from said information processing device, the authentication information generated based on the challenge information by said server device in a way that uses a predetermined encryption key and transmitted to said information processing device via the logical connection for the determining process, and said authenticating unit collates the challenge information extracted from the received authentication information by use of a decryption key corresponding to the predetermined encryption key with the challenge information transmitted by said challenge transmitting unit and, if coincident with each other, authenticates said server device as the valid server device.

2. A communication cutoff device according to claim 1, further comprising a physical address masquerading unit to guide information transmitted from said information processing device to said communication cutoff device by sending a physical address of said communication cutoff device as a response to a query about a physical address of a device other than said information processing device, said query is transmitted by said information processing device, wherein said communication cutoff unit cuts off at least a part of the communications performed by said information processing device by not forwarding at least a part of the guided information.

3. A quarantine system comprising:
the communication cutoff device according to claim 1; and
the server device comprising:
a connection accepting unit to accept the logical connection from said information processing device, which is redirected by said communication cutoff device which cuts off at least a part of the communications performed by said information processing device;
a determining unit to acquire the environment of said information processing device via the logical connection accepted by said connection accepting unit and to determine whether the acquired environment satisfies the predetermined conditions or not;
a cutoff cancel permission information transmitting unit to transmit, to said information processing device, if said determining unit determines that the environment of said information processing device satisfies the predetermined conditions, the piece of cutoff cancel permission information indicating that the cutoff may be canceled via the logical connection which is established between said server device and said information processing device;
an authentication information transmitting unit to transmit the authentication information for undergoing the authentication by said communication cutoff device to said information processing device via the logical connection accepted by said connection accepting unit, and to transmit the authentication information to said communication cutoff device from said information processing device;
a challenge information receiving unit to receive the challenge information transmitted to said information processing device from said communication cutoff device via the logical connection accepted by said connection accepting unit; and
an authentication information generating unit to generate the authentication information by use of the challenge information and the predetermined encryption key,
wherein said authentication information transmitting unit transmits the authentication information generated by said authentication information generating unit.

4. A method by which a computer connected to an information processing device and a communication cutoff device via a network executes steps comprising:
cutting off at least a part of communications performed by said information processing device;
making said information processing device establish a logical connection, to a server device, for a determining process of determining whether an environment of said information processing device satisfies predetermined conditions or not;
detecting that said information processing device receives a cutoff cancel permission information through communications with said information processing device, when said information processing device receives from said server device a piece of cutoff cancel permission information indicating that the environment of said information processing device satisfies the predetermined conditions as a result of the determining process via the logical connection which is established between the server device and the information processing device for the determining process;
canceling a cutoff by said cutting off, when said detecting detects that said information processing device receives the cutoff cancel permission information;
receiving, from said information processing device, authentication information transmitted from said server device to said information processing device via the logical connection for the determining process;
authenticating said server device based on information contained in the authentication information received in said receiving; and
transmitting challenge information for authenticating said server device to said information processing device to thereby forward the challenge information to said server device from said information processing device, wherein
said canceling determines, when said authenticating authenticates said server device, that said information processing device receives the cutoff cancel permission information from a valid server device, and thus cancels the cutoff,
said receiving receives, from said information processing device, the authentication information generated based on the challenge information by said server device in a way that uses a predetermined encryption key and transmitted to said information processing device via the logical connection for the determining process, and
said authenticating collates the challenge information extracted from the received authentication information by use of a decryption key corresponding to the predetermined encryption key with the challenge information transmitted by said transmitting and, if coincident with each other, authenticates said server device as the valid server device.

5. A method by which a quarantine system via a network executes steps comprising:
the method according to claim 4; and
accepting the logical connection from said information processing device, which is redirected by said communication cutoff device which cuts off at least a part of the communications performed by said information processing device;
acquiring the environment of said information processing device via the logical connection accepted in said accepting and determining whether the acquired environment satisfies the predetermined conditions or not;

transmitting, to said information processing device, if it is determined in said determining that the environment of said information processing device satisfies the predetermined conditions, the cutoff cancel permission information indicating that the cutoff may be canceled via the logical connection which is established between said server device and said information processing device;

transmitting the authentication information for undergoing the authentication by said communication cutoff device to said information processing device via the logical connection accepted in said accepting, and transmitting the authentication information to said communication cutoff device from said information processing device;

receiving the challenge information transmitted to said information processing device from said communication cutoff device via the logical connection accepted in said accepting; and generating the authentication information by use of the challenge information and the predetermined encryption key, wherein said transmitting transmits the authentication information generated in said generating.

6. A readable-by-computer non-transitory recording medium recorded with a program making a computer, connected to a quarantine system, to execute steps comprising:

the method according to claim 4; and accepting the logical connection from said information processing device, which is redirected by said communication cutoff device which cuts off at least a part of the communications performed by said information processing device;

acquiring the environment of said information processing device via the logical connection accepted in said accepting and determining whether the acquired environment satisfies the predetermined conditions or not;

transmitting, to said information processing device, if it is determined in said determining that the environment of said information processing device satisfies the predetermined conditions, the cutoff cancel permission information indicating that the cutoff may be canceled via the logical connection which is established between said server device and said information processing device;

transmitting the authentication information for undergoing the authentication by said communication cutoff device to said information processing device via the logical connection accepted in said accepting, and transmitting the authentication information to said communication cutoff device from said information processing device;

receiving the challenge information transmitted to said information processing device from said communication cutoff device via the logical connection accepted in said accepting; and generating the authentication information by use of the challenge information and the predetermined encryption key, wherein said transmitting transmits the authentication information generated in said generating.

7. A readable-by-computer non-transitory recording medium recorded with a program making a computer, connected to an information processing device and a communication cutoff device via a network, to execute steps comprising:

cutting off at least a part of communications performed by said information processing device;

making said information processing device establish a logical connection, to a server device, for a determining process of determining whether an environment of said information processing device satisfies predetermined conditions or not;

detecting that said information processing device receives a cutoff cancel permission information through communications with said information processing device, when said information processing device receives from said server device a piece of cutoff cancel permission information indicating that the environment of said information processing device satisfies the predetermined conditions as a result of the determining process via the logical connection which is established between the server device and the information processing device for the determining process;

canceling a cutoff by said cutting off, when said detecting detects that said information processing device receives the cutoff cancel permission information;

receiving, from said information processing device, authentication information transmitted from said server device to said information processing device via the logical connection for the determining process;

authenticating said server device based on information contained in the authentication information received in said receiving; and transmitting challenge information for authenticating said server device to said information processing device to thereby forward the challenge information to said server device from said information processing device, wherein said canceling determines, when said authenticating authenticates said server device, that said information processing device receives the cutoff cancel permission information from a valid server device, and thus cancels the cutoff, said receiving receives, from said information processing device, the authentication information generated based on the challenge information by said server device in a way that uses a predetermined encryption key and transmitted to said information processing device via the logical connection for the determining process, and said authenticating collates the challenge information extracted from the received authentication information by use of a decryption key corresponding to the predetermined encryption key with the challenge information transmitted by said transmitting and, if coincident with each other, authenticates said server device as the valid server device.

* * * * *